(12) United States Patent
Buchmeiser et al.

(10) Patent No.: US 8,288,449 B2
(45) Date of Patent: Oct. 16, 2012

(54) LATENT PHOTOACTIVATABLE PRECATALYSTS FOR METATHESIS POLYMERIZATION

(75) Inventors: Michael R. Buchmeiser, Remshalden (DE); Dongren Wang, Stuttgart (DE)

(73) Assignee: Deutsche Institute fuer Textil- und Faserforschung Denkendorf, Denkendorf (DE)

( * ) Notice: Subject to any disclaimer, the term of this patent is extended or adjusted under 35 U.S.C. 154(b) by 0 days.

(21) Appl. No.: 12/866,806

(22) PCT Filed: Jan. 16, 2009

(86) PCT No.: PCT/EP2009/000246
§ 371 (c)(1),
(2), (4) Date: Aug. 9, 2010

(87) PCT Pub. No.: WO2009/097955
PCT Pub. Date: Aug. 13, 2009

(65) Prior Publication Data
US 2011/0003905 A1     Jan. 6, 2011

(30) Foreign Application Priority Data

Feb. 8, 2008 (DE) .................. 10 2008 008 299

(51) Int. Cl.
*C08F 2/50* (2006.01)
*C08J 3/28* (2006.01)
*C07F 17/02* (2006.01)

(52) U.S. Cl. ............ 522/66; 522/63; 522/65; 522/67; 428/508; 428/517; 548/100; 548/101; 548/103

(58) Field of Classification Search ................. 522/65, 522/66, 67; 427/508, 517; 548/100, 101, 548/103
See application file for complete search history.

(56) References Cited

U.S. PATENT DOCUMENTS 7,538,172 B2     5/2009    Moszner et al.

FOREIGN PATENT DOCUMENTS

EP     1614410 A1     1/2006

OTHER PUBLICATIONS

Wag et al. Cationic Rull Complexes with N-Heterocyclic Carbene Ligands for UV-Induced Ring-Opening Metathesis Polymerization. Angewandte Chemie International Edition. vol. 47, Issue 17, pp. 3267-3270, Apr. 14, 2008.*
Hafner Andreas et al: "Thermal- and Photoinduced Ring-opening Metathesis Polymerization (ROMP)/(PROMP): An Efficient Tool in Polymer Chemistry", Progress in Organic Coatings, 32(1-4), p. 89-96 Coden: POGCAT, ISSN: 0300-9440, 1997, XP009114553.

* cited by examiner

*Primary Examiner* — Sanza McClendon
(74) *Attorney, Agent, or Firm* — Laurence A. Greenberg; Werner H. Stemer; Ralph E. Locher

(57) ABSTRACT

Latent photoactivatable precatalysts are provided for metathesis polymerization and has the general formula (Ru(NHC)$_n$(X$^1$)$_m$(L)$_o^{p+}$((X$^2$)$^-$)$_p$. Wherein NHC is an N-heterocyclic carbene, n=1 or 2; X$^1$ is a C1-C$_{18}$ mono or polyhalogenized carbolic acid or trifluoromethane sulfate; X$^2$ is a C1-C$_{18}$ mono or polyhalogenized carbolic acid, trifluoromethane sulfate, tetrafluoroborate, hexafluorophosphate, or hexafluoroantimonate; m=0, 1, or 2 and L=a C$_4$-C$_{18}$ carbolic acid nitrile or a C$_4$-C$_{18}$ carbolic acid di or trinitrile; o=6−n−m or 5−n−m and p=2−m.

8 Claims, 1 Drawing Sheet

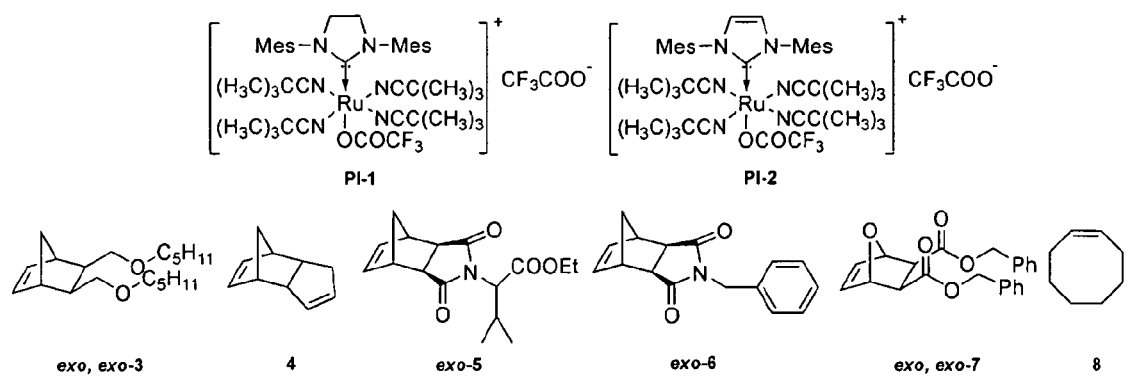
Used pre catalysts and monomers

LATENT PHOTOACTIVATABLE PRECATALYSTS FOR METATHESIS POLYMERIZATION

BACKGROUND OF THE INVENTION

Field of the Invention

The invention relates to photoactivatable, latent catalyists, which can be especially used for modifying surfaces by means of metathesis polymerization.

The term metathesis polymerization comprises the Ring-Opening Metathesis Polymerizations (ROMP), the Acyclic Diene Metathesis (ADMET) Polymerization, the 1-alkine polymerization, and the cyclopolymerization of 1,6-heptadiines.

All of these metathesis polymerizations have the common feature that they are catalyzed by Fischer-respectively Schrock-type metal carbene complexes. Such metal carbene complexes may be components of the catalyst system in the form of defined bonds, or they can be generated in situ by a process preceding the polymerization.

Where the metal carbene complexes are components of the catalyst system they can produce either intrinsic or latent activities.

In the first case, no activation will be needed; in the latter an activating stage is necessary. Such an activating stage may be induced thermally, i.e. by increasing the temperature, or photochemically, by exposure to radiation, for instance.

Alternatively, you can use precatalysts which will not generate polymerization active transition metal carbenes until they have contact with the monomer and/or by adding appropriate reagents and/or by external activation.

External activation may include a photochemical (UV-Vis light) or thermal process (heating). Precatalysts which in the presence of monomers need an external stimulus to become polymerization active, by either increasing the temperature or by radiation with UV or visible light, are called latent precatalysts.

The present state of the art knows a number of systems for the production of photochemically activatable precatalysts for metathesis polymerization, such as the Ru(II) and Os(II) complexes [Ru(p-cymene)Cl$_2$(PR$_3$)], [Os(p-cymene)Cl$_2$(PCy$_3$)]5 (Cy=cyclohexyl), [RuCl$_2$(PCy$_3$)(p-cymene)], [Ru(arene)$_6$X$_2$], [Ru(L)$_6$ (X")$_2$] (L=H$_2$O, acetonitrile, propionitrile; X'=tosylate, trifluoromethane sulfate, chloride; arene=benzene, toluene, hexamethylbenzene, p-cymene), [Ru(arene)Cl$_2$(L)2] (arene=benzene; L=picoline); [RuCl$_2$(IMes)(p-cymene)], [RuCl$_2$(IMesH$_2$)(p-cymene)], (IMes=1,3-dimesitylimidazol-2-ylidene, IMesH$_2$=1,3-dimesitylimidazolin-2-ylidene).

A general problem of all existing, "latent", photochemically activatable latent catalysts and precatalysts for metathesis polymerization is the fact that they show an intrinsic metathesis polymerization activity in the absence of light or UV light. This means that mixtures made of a monomer and a latent catalyst or precatalyst will not be thermally stable and polymerization will occur at ambient temperature, sometimes very slowly, even without the influence of light and without any heating of the catalyst or precatalyst/monomer mixture. You can say that these systems show a latent behaviour which is at least very limited if they show any at all.

BRIEF SUMMARY OF THE INVENTION

It is the goal of the present invention to provide a latent precatalyst system which ensures that all of these difficulties are avoided. It is, furthermore, on the one hand, the goal of the invention to provide a procedure which facilitates the easy and fast photochemical generation of polymer layers by means of metathesis polymerization, and, on the other hand, to provide generally latent precatalysts for metathesis reactions, such as the ring-opening metathesis polymerization, or the Acyclic Diene Metathesis (ADMET) Polymerization.

The essential requirement of the invention is that the latent precatalyst system of the invention results from the general formula

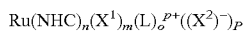

$$Ru(NHC)_n(X^1)_m(L)_o^{p+}((X^2)^-)_p$$

wherein NHC is an N-heterocyclic carbene, n=1 or 2; $X^1$ is a C1-C$_{18}$ mono or polyhalogenized carbolic acid or trifluoromethane sulfate; $X^2$ is a C1-C$_{18}$ mono or polyhalogenized carbolic acid, trifluoromethane sulfate, tetrafluoroborate, hexafluorophosphate, or hexafluoroantimonate; m=0, 1 or 2 and L=a C$_4$-C$_{18}$ carbolic acid nitrile or a C$_4$-C$_{18}$ carbolic acid di- or trinitrile; o=6−n−m or 5−n−m and p=2−m.

Preference is given to the use of cationic Ru(II) complexes (p=2−m) with tert-butylnitrile ligands (L) and trifluoracetate ligands ($X^1$=$X^2$=CF$_3$COO'), but not exclusively.

Furthermore, the requirement of the invention is met by a procedure to modify surfaces or to functionalize surfaces with metathesis polymerization using latent precatalysts.

"Modification" or "functionalization" within the meaning of the invention is the grafting of monomer bonds on to the surface by way of a polymerization process or the application of polymer layers from such monomer bonds on to the surface.

"Latent" within the meaning of the invention is the fact that the precatalyst does not show any significant polymerization activity in the presence of the monomer and the absence of light <350 nm up to a temperature of 40° C. within a period of 2 hours (<10% conversion).

"Photoactivatable" within the meaning of the invention is the quality that a mixture from monomer and precatalyst can be activated, i.e. induced to polymerize with UV light <350 nm, preferably UV light of 254 nm.

In the following please find some examples of especially favorable embodiments of the invention without however limiting the invention in any way.

EXPERIMENTAL INFORMATION

A.1 General

All experiments were carried out in a glovebox (MBraun LabMaster 130) or in a Schlenk line under an N2 atmosphere.

Commercial materials were used without further cleaning.

Tetrahydrofuran (THF) and dichlorethane were distilled off of sodium/benzophenone and/or CaH2.

Pentane, diethyl ether, toluol, and methylenechloride were dried with an MBraun SPS System.

The 'H-NMR spectres were recorded by a Bruker Spectrospin 250 at 250.13 MHz, the $^{13}$C-NMR spectres at 62.90 MHz in the indicated solvent at 25° C. and are indicated in the dimension "parts per million (ppm)" relative to tetramethylsilane.

The coupling constant quantities are indicated in Hz.

The IR spectres were recorded by means of ATR technology by a Bruker Vector 22.

The molecular weights and polydispersity indices (PDIs) of the polymers were determined by GPC at 30° C. on PLgel 10 μm MIXED-B, 7.5×300 mm columns (Polymer Laboratories) in THF at 25° C. with a Waters autosampler, a Waters 484 UV detector (254 nm), an Optilab Rex RI detector (Wyatt) and a MiniDawn light scattering detector (Wyatt).

The water contact angle measurements were performed on corresponding equipment made by the company Krüss GmbH (Germany).

A.2 Reagents and Standards

[Ru(CF$_3$CO$_2$)$_2$(p-cymene)(IMesH$_2$)], [Ru(CF$_3$CO$_2$)$_2$(p-cymene)(IMes)], exo, exo-2,3-di-(pentoxymethyl)norbornen, exo, exo-N,N-(Norborn-5-ene-2,3-dicarbimido)-L-valinethylester, exo, exo-7-oxabicyclo[2.2.1]hept-5-en-2,3-dicarbolic acid dibenzylester, and (N-benzyl)-5-norbornen-exo-2,3-dicarboximide were produced in the usual manner.

The purity of all bonds was verified by means of NMR.

BRIEF DESCRIPTION OF THE DRAWING

FIG. 1 is a summarized overview of the used monomers and the structures of PI-1 and PI-2

DESCRIPTION OF THE INVENTION

A.3 Syntheses

A.3.1

[Ru(CF$_3$CO$_2$)$_2$(NCC(CH$_3$)$_3$)$_4$(IMesH$_2$)] (PI-1): (700 mg, 0.91 mmol) [Ru(CF$_3$CO$_2$)$_2$ (IMesH$_2$)(p-cymene)] were suspended in 5 mL absolute trimethylacetonitrile. The mixture was heated up to 90° C. for 12 hours. After cooling to ambient temperature, all volatile elements of the vacuum were removed, and the residue washed with diethyl ether and dried under vacuum. Yield:

600 mg (92%). $\lambda_{max}$<=230 nm; $^1$HNMR (CDCl$_3$): δ 6.95 (s, 4H), 3.89 (s, 4H); 2.31 (s, 18H); 1.27 (s, 36H). $^{13}$CNMR (CDCl$_3$): δ 207.1, 161.5 (q, CO, $^2$J($^{19}$F, $^{13}$C)=34 Hz), 160.4 (q, CO, $^2$J($^{19}$F, $^{13}$C)=32 Hz), 138.2, 138.1, 136.1, 130.5, 129.4, 117.6 [q, CF$_3$, $^1$J($^{19}$F, $^{13}$C)=299 Hz], 115.7 [q, CF$_3$, $^1$J($^{19}$F, $^{13}$C)=293.8 Hz], 52.6, 29.9, 27.8, 21.1, 17.9. IR (ATR): 2975.5 (w), 1691.7 (s), 1473.6 (m), 1372.7 (m), 1247.5 (m), 1192.2 (m), 1115.1 (m), 719.8 (w).

Elementary analysis prepared for C$_{45}$H$_{62}$F$_6$N$_6$O$_4$Ru (M$_r$=966.07) C, 55.95; H, 6.47; N, 8.70.

found: C, 55.63; H, 6.37; N, 8.50.

A.3.2

[Ru(CF$_3$CO$_2$)$_2$(NCC(CH$_3$)$_3$)$_4$(IMes)] (PI-2): The compound was produced, in an analogue way as for PI-1, from [Ru(CF$_3$CO$_2$)$_2$ (IMes)(p-cymene)] (500 mg, 0.65 mmol) and 5 mL absolute trimethylacetonitrile.

Yield:
400 mg (85%). $\lambda_{max}$=255 nm; $^1$H NMR (CDCl$_3$): δ 7.01 (s, 4H), 6.93 (s, 2H); 2.38 (s, 6H); 2.10 (s, 12H); 1.27 (s, 36H). $^{13}$C NMR (CDCl$_3$): δ 175.4, 161.8 (q, CO, $^2$J($^{19}$F, $^{13}$C)=34.1 Hz), 160.6 (q, CO, $^2$J($^{19}$F, $^{13}$C)=32 Hz), 139.3, 137.6, 135.8, 130.7, 129.1, 128.5, 117.7 [q, CF$_3$, $^1$J($^{19}$F, $^{13}$C)=298.2 Hz], 115.7 [q, CF$_3$, $^1$J($^{19}$F, $^{13}$C)=293.6 Hz], 30.1, 28.0, 21.3, 17.9. IR (ATR): 2975.7 (w), 1689.9 (s), 1471.9 (m), 1396.2 (m), 1304.7 (m), 1192.2 (m), 1116.5 (m), 711.4 (w).

A.3.3

Typical solution polymerization: PI-1 (4 mg, 4×10$^{-3}$ mmol) and the monomer (1.0 mmol) were solved in 5 ml CDCl$_3$ and supplied into a quartz Schlenk tube. The mixture was exposed to radiation for 60 minutes, while stirring (254 nm, 90 J/cm$^2$). The polymer solution was poured onto methanol and the polymer filtered off. After washing with methanol and pentane, the polymer was dried at 40° C. under vacuum.

A.3.4

Typical surface modification with photo-induced ring-opening metathesis polymerization (ROMP): A solution of PI-1 (4 mg, 4×10$^{-3}$ mmol) in 1,2,4-trichlorobenzenel (5 mL) and dicyclopentadiene (60.0 mg, 1 mmol) was applied to glass, for instance, by means of an appropriate application system (doctor blade), spread to a wet thickness of ca. 5 μm, and exposed to UV light radiation (254 nm, 1.5 J/cm$^2$). Such exposure may by choice be performed through a screen. After 1 min, the polymer layer was washed with methylene chloride and dried afterwards.

Water contact angle measurements resulted in a contact angle of 95.5°, which is strongly deviating from that of the native glass surface)(50.7°.

A.3.5

Typical surface functionalization with photo-induced ring-opening metathesis polymerization (ROMP): In a silanizing step, glass panes were initially pre-functionalized with norbornene groups. Such a pre-functionalization was achieved by storing the glass panes for 1 hour in ethanolic caustic potash solution, rinsing with water and acetone afterwards, drying (for 10 min at 90° C.) and finally storing in a solution of chlorodimethyl silyle norobornene (10 wt. %) for 1 hour.

Prior to any further coating, the glass panes were washed with acetone and dried at 45° C. A solution of PI-1 (4 mg, 4×10$^{-3}$ mmol) in 1,2,4-trichlorebenzene (5 mL) and dicyclopentadiene (60.0 mg, 1 mmol) were applied to a norbornene-modified glass pane by means of an appropriate application system. The layer was spread to a wet thickness of ca. 1 μm and exposed to UV light radiation (254 nm, 1.5 J/cm$^2$). Such exposure may by choice be performed through a screen. After 1 min, the polymer layer was washed with methylene chloride and dried afterwards.

A.4

Summary of the Polymerization Results in Solution:

TABLE 1

Polymerization results for the monomers 3-8 with PI-1 and PI-2 and radiation at 308 and/or 254 nm.

| PI | Monomer | Yield[a] 308 nm | Yield[a] 254 nm | $M_n$/PDI[a] 254 nm | cis (%) 254 nm |
|---|---|---|---|---|---|
| 1 | exo, exo-3 | 40[b] | 95[b] | 4.8 × 10$^5$/1.8 | 61 |
| 1 | 4 | 82 | 99 | — | — |
| 1 | exo-5 | 69 | 85 | 2.1 × 10$^5$/1.8 | 53 |

TABLE 1-continued

Polymerization results for the monomers 3-8 with PI-1 and PI-2 and radiation at 308 and/or 254 nm.

| PI | Monomer | Yield[a] 308 nm | Yield[a] 254 nm | $M_n$/PDI[a] 254 nm | cis (%) 254 nm |
|----|---------|-----------------|-----------------|---------------------|----------------|
| 1 | exo-6 | 90 | 92 | $8.8 \times 10^5$/1.92 | 52 |
| 1 | exo, exo-1 | <5[b] | 90 | $2.6 \times 10^5$/3.7 | 49 |
| 1 | 8 | 33[b] | 99[b] | 40,000/1.2 | — |
| 2 | exo, exo-3 | 41[b] | 92[b] | — | 61 |
| 2 | 4 | >99 | 99 | — | — |
| 2 | exo-5 | 61 | 61 | $4 \times 4 \times 10^5$/2.45 | 51 |
| 2 | exo-6 | 91 | 90 | $8.8 \times 10^5$/2.0 | 48 |
| 2 | exo, exo-1 | <5[b] | 86 | $4.5 \times 10^5$/4.53 | 43 |
| 2 | 8 | 21[b] | >99[b] | 49,000/1.8 | — |

[a]in 5 ml CDCl3, monomer: precatalyst ratio = 200:1, 30° C./1h, isolated yield in %;
[b]in 5 ml CDCl3, monomer: precatalyst ratio = 200:1, 30° C./1h, yield determined by means of $^1$H-NMR.

Poly(exo-3)$_{200}$ produced with PI-1: $^1$H NMR (CDCl$_3$): δ 5.27~5.17 (m, 2H); 3.85 (br, s, 8H); 2.67 (br, s, 1H); 2.34 (br, s, 1H); 1.96 (br, s, 3H); 1.55 (br, s, 4H); 1.32 (br, s, 9H); 0.90 (br, s, 6H). $M_n$: 48000, polydispersity (PDI): 1.8.

Poly(exo-3)$_{200}$ produced with PI-2: $^1$HNMR (CDCl$_3$): δ 5.27~5.17 (m, 2H); 3.85 (br, s, 8H); 2.67 (br, s, 1H); 2.34 (br, s, 1H); 1.96 (br, s, 3H); 1.55 (br, s, 4H); 1.32 (br, s, 9H); 0.90 (br, s, 6H). $^{13}$C NMR (CDCl$_3$): δ 133.9 (m), 71.0, 70.6, 62.1, 47.6~45.0 (m), 41.0, 39.0, 29.5, 28.5, 22.5, 14.

Poly(exo-5)$_{200}$ produced with PI-1: $^1$HNMR (CDCl$_3$): δ 5.75-5.50 (m, 2H); 4.29~4.14 (m, 3H); 3.20~2.60 (m, 5H); 2.16 (br, s, 1H); 1.67~1.59 (m, 1H); 1.23~1.10 (br, d, 6H); 0.82 (br, s, 3H). $^{13}$CNMR (CDCl$_3$): δ 177.6, 168.4, 133.6, 132.5, 131.7, 61.4, 57.7, 52.6, 52.1, 51.5, 50.6, 46.4, 46.0, 42.5, 42.0, 41.0, 27.9, 27.8, 21.2, 19.4, 14.1. $M_n$: $2.1 \times 10^6$, PDI: 1.9.

Poly(exo-5)$_{200}$ produced with PI-2: $^1$HNMR (CDCl$_3$): δ 5.74-5.49 (m, 2H); 4.28~4.13 (m, 3H); 3.27~2.59 (m, 5H); 2.14 (br, s, 1H); 1.61~1.56 (m, 1H); 1.23~1.09 (br, d, 6H); 0.82 (br, s, 3H). $^{13}$C NMR (CDl$_3$): δ 177.6, 168.4, 133.6, 132.5, 131.5, 61.4, 57.7, 52.6, 52.3, 50.6, 46.6, 46.4, 45.9, 42.5, 41.9, 41.9, 27.9, 27.8, 21.2, 19.4, 14.1. $M_n$: $4.4 \times 10^5$, PDI: 2.45.

Poly(exo-6)$_{200}$ produced with PI-1: $^1$H NMR (CDCl$_3$): δ 7.30 (m, 5H); 5.72~5.48 (m, 2H); 4.58 (s, br, 2H); 3.25~2.64 (m, 4H); 2.12~2.07 (m, 1H); 1.6~1.52 (m, 1H). $^{13}$C NMR (CDCl$_3$) δ 177.9, 136.0, 133.5, 131.8, 128.6, 127.9, 127.8, 53.0, 52.6, 52.2, 51.7, 51.0, 50.8, 46.0, 45.9, 45.6, 42.8, 42.2, 41.8, 40.9. $M_n$: $8.8 \times 10^5$, PDI: 1.92.

Poly(exo-6)$_{200}$ produced with PI-1: $^1$H NMR (CDCl$_3$): δ 7.33~7.22 (m, 5H), 5.74~5.42 (m, 2H); 4.58~4.48 (m, 2H), 3.02~2.65 (m, 4H), 2.13~2.11 (m, 1H), 1.56~1.54 (m, 1H). $^{13}$C NMR (CDCl$_3$) δ 177.8, 136.0, 133.5, 131.7, 128.6, 127.9, 127.8, 53.0, 52.6, 52.2, 51.7, 51.0, 50.8, 46.0, 45.9, 45.6, 42.8, 42.2, 41.8, 40.9. $M_n$: $8.8 \times 10^5$, PDI: 2.0.

Poly(exo-7)$_{200}$ produced with PI-1: $^1$H NMR (CDCl$_3$): δ 7.24 (s, br, 10H), 5.80~5.54 (m, 2H), 5.13~4.63 (m, 6H); 3.02 (m, 2H). $^{13}$C NMR (CDCl$_3$): δ 170.1, 135.3, 132.3, 131.3, 130.9, 128.4, 80.5, 66.8, 52.4 (m). $M_n$: $2.6 \times 10^5$, PDI: 3.7.

Poly(exo-7)$_{200}$ produced with PI-2: $^1$H NMR (CDCl$_3$): δ 7.24 (s, br, 10H), 5.81~5.55 (m, 2H), 5.11~4.63 (m, 6H); 3.02 (m, 2H). $^{13}$C NMR (CDCl$_3$) δ 170.1, 135.3, 132.3, 131.3, 130.9, 128.4, 80.5, 66.8, 52.4 (m). $M_n$: $4.5 \times 10^5$, PDI: 4.5.

Poly(8)$_{200}$ produced with PI-1: $^1$H NMR (CDCl$_3$): δ 5.37 (m, 2H), 1.97 (br, s, 4H), 1.2 (br, s, 8H). $^{13}$C NMR (CDCl$_3$) δ 129.6, 28.8, 25.7, 25.0. $M_n$: 40000, PDI: 1.2.

Poly(8)$_{200}$ produced with PI-2: $^1$H NMR (CDCl$_3$): δ 5.37 (m, 2H), 1.97 (br, s, 4H), 1.2 (br, s, 8H). $^{13}$C NMR (CDCl$_3$) δ 129.6, 28.8, 25.7, 25.0. $M_n$: 49000, PDI: 1.29.

The invention claimed is:

1. Latent photoactivatable precatalysts for metathesis polymerization, comprising:
general formula:

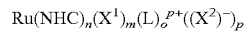

wherein:
NHC is an N-heterocyclic carbene, n=1 or 2;
$X^1$ is a C1-$C_{18}$ mono or polyhalogenized carbolic acid or trifluoromethane sulfate;
$X^2$ is a C1-$C_{18}$ mono or polyhalogenized carbolic acid, trifluoromethane sulfate, tetrafluoroborate, hexafluorophosphate, or hexafluoroantimonate;
m=0, 1 or 2 and L=a $C_4$-$C_{18}$ carbolic acid nitrile or a $C_4$-$C_{18}$ carbolic acid di- or trinitrile; and
o=6−n−m or 5−n−m and p=2−m.

2. The latent photoactivatable precatalysts for metathesis polymerization according to claim 1, wherein the general formula uses a 1,3-dimesitylimidazol-2-ylidene or a 1,3-dimesitylimidazolin-2-ylidene and $X^1$=$X^2$=CF$_3$COO, L=tert-butylnitrile, m=1, n=1, o=4 and p=1.

3. The latent photoactivatable precatalysts for metathesis polymerization according to claim 1, further comprising cyclic olefins selected from the group consisting of norbornene, norbornadiene, cyclooctene, substituted norbornenes, substituted norbornadienes, substituted cyclooctenes, and substituted cyclobutenes.

4. A method, which comprises the steps of:
performing one of modifying surfaces and functionalizing surfaces with metathesis polymerization using latent photoactivatable precatalysts, the latent photoactivatable precatalysts for the metathesis polymerization, containing:
a general formula:

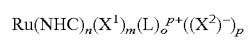

wherein:
NHC is an N-heterocyclic carbene, n=1 or 2;
$X^1$ is a C1-$C_{18}$ mono or polyhalogenized carbolic acid or trifluoromethane sulfate;
$X^2$ is a C1-$C_{18}$ mono or polyhalogenized carbolic acid, trifluoromethane sulfate, tetrafluoroborate, hexafluorophosphate, or hexafluoroantimonate;
m=0, 1 or 2 and L=a $C_4$-$C_{18}$ carbolic acid nitrile or a $C_4$-$C_{18}$ carbolic acid di- or trinitrile; and
o=6−n−m or 5−n−m and p=2−m.

5. The method according to claim 4, wherein a polymer layer to be applied to a surface has a minimum thickness of up to 2 cm, the polymer layer being composed of at least one layer.

6. The method according to claim 4, which further comprises converting the latent photoactivatable precatalysts to metathesis polymerization active catalysts by exposure to light radiation of a wave length of <350 nm in a presence of cyclic olefins.

7. The method according to claim 4, wherein the metathesis polymerization is selected from the group consisting of a ring-opening metathesis polymerization and an acyclic diene metathesis polymerization.

8. The method according to claim 5, wherein the polymer layer has a minimum thickness of up to 100 μm.

* * * * *